US 010810311B2

(12) United States Patent
Kim et al.

(10) Patent No.: US 10,810,311 B2
(45) Date of Patent: Oct. 20, 2020

(54) INTERNET-OF-THINGS MODULE (71) Applicant: SAMSUNG ELECTRONICS CO., LTD., Suwon-si, Gyeonggi-do (KR)

(72) Inventors: Jae Hoon Kim, Anyang-si (KR); Bo Gyeong Kang, Suwon-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 184 days.

(21) Appl. No.: 16/037,554

(22) Filed: Jul. 17, 2018

(65) Prior Publication Data
US 2019/0087581 A1 Mar. 21, 2019

(30) Foreign Application Priority Data

Sep. 21, 2017 (KR) .................. 10-2017-0121672
Feb. 27, 2018 (KR) .................. 10-2018-0023572

(51) Int. Cl.
*G06F 21/57* (2013.01)
*G06F 21/78* (2013.01)
*H04L 9/08* (2006.01)
*G06F 8/71* (2018.01)
*G06F 8/65* (2018.01)
*G06F 12/14* (2006.01)
*G09C 1/00* (2006.01)

(52) U.S. Cl.
CPC .............. *G06F 21/575* (2013.01); *G06F 8/65* (2013.01); *G06F 8/71* (2013.01); *G06F 12/1458* (2013.01); *G06F 21/572* (2013.01); *G06F 21/78* (2013.01); *G09C 1/00* (2013.01); *H04L 9/0861* (2013.01); *H04L 9/0866* (2013.01)

(58) Field of Classification Search
CPC . G06F 8/65; G06F 8/71; G06F 21/572; G06F 21/575; G06F 21/78; H04L 9/0861; H04L 9/0866; G09C 1/00
See application file for complete search history.

(56) References Cited

U.S. PATENT DOCUMENTS

| | | | |
|---|---|---|---|
| 9,058,496 B1* | 6/2015 | Dasari | G06F 21/60 |
| 2011/0087872 A1* | 4/2011 | Shah | G06F 21/64 |
| | | | 713/2 |
| 2014/0130151 A1* | 5/2014 | Krishnamurthy | G06F 8/65 |
| | | | 726/22 |
| 2015/0143163 A1* | 5/2015 | Dasari | G06F 11/1417 |
| | | | 714/6.3 |
| 2015/0256332 A1* | 9/2015 | Raj | H04L 63/0428 |
| | | | 713/150 |
| 2017/0185781 A1* | 6/2017 | Kim | G06F 21/575 |
| 2017/0322790 A1* | 11/2017 | Surdu | G06F 11/1433 |
| 2018/0196945 A1* | 7/2018 | Kornegay | G06F 21/85 |
| 2020/0014544 A1* | 1/2020 | Sela | G06F 12/1466 |

* cited by examiner

*Primary Examiner* — Nimesh G Patel
(74) *Attorney, Agent, or Firm* — Lee IP Law, PC (57) ABSTRACT

An Internet of Things module includes a memory including a boot area for storing boot firmware and first security information and a security area for storing a firmware release version and second security information, and a processor to perform a boot process of the Internet of Things module using the boot firmware in the boot area and to determine whether the boot process of the Internet of Things module is progressed or stopped through comparing the first security information in the boot area with the second security information in the security area and through comparing a version of the boot firmware in the boot area with the firmware release version in the security area.

23 Claims, 9 Drawing Sheets

INTERNET-OF-THINGS MODULE

CROSS-REFERENCE TO RELATED APPLICATION

Korean Patent Application No. 10-2017-0121672, filed on Sep. 21, 2017 and Korean Patent Application No. 10-2018-0023572, filed on Feb. 27, 2018, in the Korean Intellectual Property Office, and entitled: "Internet-of-Things Module," is incorporated by reference herein in its entirety.

BACKGROUND

1. Field

Embodiments relate to an Internet of Things module for an Internet of Things device.

2. Description of the Related Art

The security of Internet of Things modules embedded in Internet of Things devices are significant, because the Internet of Things devices are connected to a communications network and are communicated with each other through the Internet of Things modules therein. However, in a manner different from a computer device or a mobile device including a relatively high-cost security system, the Internet of Things modules for the Internet of Things devices are implemented with relatively low-cost security systems, as the Internet of Things modules are provided as common devices or common parts for manufacturing the Internet of Things devices. Moreover, as manufacturers of the Internet of Things modules may be different from producers manufacturing the Internet of Things devices having the Internet of Things modules and distributors providing the Internet of Things devices to end-users, boot firmware stored in the Internet of Things modules may be easily hacked or unintentionally rolled back to a previous version of the boot firmware.

SUMMARY

Embodiments are directed to an Internet of Things module including a memory including a boot area for storing boot firmware and first security information and a security area for storing a firmware release version and second security information, and a processor to perform a boot process of the Internet of Things module using the boot firmware in the boot area, and to determine whether the boot process of the Internet of Things module is progressed or stopped through comparing the first security information in the boot area with the second security information in the security area and through comparing a version of the boot firmware in the boot area with the firmware release version in the security area.

Embodiments are directed to an Internet of Things module including a first memory including a boot area for storing boot firmware for booting and a security area for storing a firmware release version for a rollback checking function of the boot firmware, a second memory including a secure boot logic for obtaining the firmware release version in the security area through accessing the security area, and a processor to provide a rollback protection function through comparing a version of the boot firmware in the boot area with the firmware release version in the security area.

Embodiments are directed to an Internet of Things module including a memory including a boot area for storing boot firmware and a security area for storing a predetermined authentication key, the security area and the boot area having different accessibility, and a processor including a hardware unique key generation circuit to generate a hardware unique key based on a structure of an internal circuit, to store the hardware unique key in the security area as the predetermined authentication key when the boot firmware is first executed, and to obtain an access authority for accessing the security area through an authentication procedure using the hardware unique key.

BRIEF DESCRIPTION OF THE DRAWINGS

Features will become apparent to those of ordinary skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Hereinafter, example embodiments of the present disclosure will be described in detail with reference to the accompanying drawings.

Figure 1:
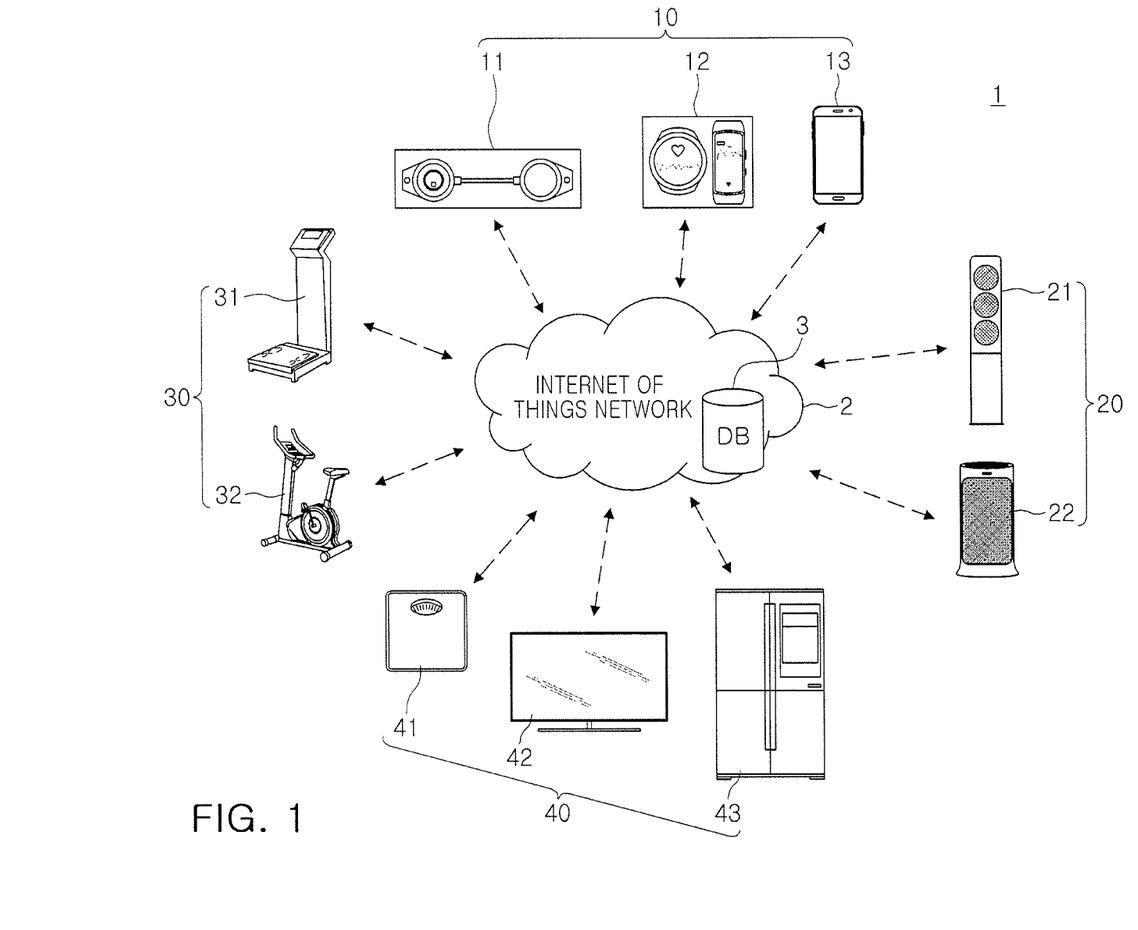
FIG. 1 illustrates a schematic view for describing an Internet of Things system including an Internet of Things module according to an example embodiment.

FIG. 1 is a schematic view for describing an Internet of Things system according to an example embodiment. Referring to FIG. 1, an Internet of Things system 1 may include a plurality of Internet of Things devices 10 to 40 and an Internet of Things network 2 for mediating communications between the Internet of Things devices 10 to 40. The Internet of Things network 2 may be connected to the plurality of the Internet of Things devices 10 to 40 and may provide a cloud service using a database 3.

Each of the Internet of Things devices 10 to 40 may include an Internet of Things module for performing a communications function through the Internet of Things network 2. The Internet of Things module may include a processor unit for performing an overall control and arithmetic functions, a memory unit for storing data, a sensor unit for collecting additional information, a communications unit for performing communications with the Internet of Things network 2, and the like. For example, an Internet of Things module, embedded in an air conditioner 21, an air cleaner 22, or the like, may include a sensor for measuring an ambient temperature and humidity, a fine dust concentration, or the like. A refrigerator 43 may include a sensor for measuring an internal temperature and humidity, or the like.

The Internet of Things network 2 may be a type of communications network, and may mediate communications among the Internet of Things devices 10 to 40. In an example embodiment, the Internet of Things network 2 may have the database 3 including identification information for connection with the Internet of Things network 2. For example, identification information of the Internet of Things devices 10 to 40 registered in the Internet of Things system 1 may be stored in the database 3. When identification information of other devices are not stored in the database 3, the other devices may be considered as non-permissible devices such that the other devices may not be connected to the Internet of Things network 2 and may not be registered in the Internet of Things system 1. When a new device tries to access the Internet of Things network 2, the identification information stored in the database 3 and identification information of the new device are compared with each other in order to determine whether the new device is permitted to access the Internet of Things system 1 or not. For example, when the identification information of the new device is in the database 3, the new device may be connected to the Internet of Things network 2 and may be registered in the Internet of Things system 1. When the identification information of the new device is not in the database 3, the new device may not be connected to the Internet of Things network 2 and may not be registered in the Internet of Things system 1.

In an example embodiment, a module manufacturer, producing and providing an Internet of Things module, may be different from a device manufacturer producing and providing the Internet of Things devices 10 to 40. In other words, the device manufacturer may purchase the Internet of Things module from the module manufacturer, may process or modify the Internet of Things module, and may manufacture a variety of Internet of Things devices by mounting the processed/modified Internet of Things module thereon. For example, in the Internet of Things system 1 of FIG. 1, device manufacturers, producing respective Internet of Things devices 10 to 40, may be different from each other.

Different device manufacturers, purchasing the same kind of Internet of Things module, may manufacture a variety of and different quantities of Internet of Things devices. Thus, it may be practically difficult that the module manufacturer manufacturing the same kind of Internet of Things module assigns or allocates different security keys to the respective device manufacturers. The module manufacturer may implement a security function in boot firmware (or in an operating system) using a common security key rather than the different security keys. Thus, the Internet of Things devices manufactured with the same kind of Internet of Things module may be exposed to a risk of hacking, e.g., boot firmware hacking.

In order to solve the problem described above, a method, e.g., using eFuse, in which some circuits are intentionally disabled, may be used. However, it may not be easy to apply the eFuse to the Internet of Things module due to a manufacturing cost limitation or a manufacturing space limitation of the Internet of Things module. In an example embodiment, a security area of a memory mounted (or embedded) in an Internet of Things module is used for providing a secure boot function and/or a firmware rollback protection function. Thus, when the Internet of Things devices are manufactured with the Internet of Things module having the security area of the memory, in which the secure boot function and/or the firmware rollback protection function may be implemented, the Internet of Things devices may not be exposed to a risk of hacking and may have an improved security without assigning/allocating different security keys to each of Internet of Things modules that are sold to different device manufacturers.

Figure 2:
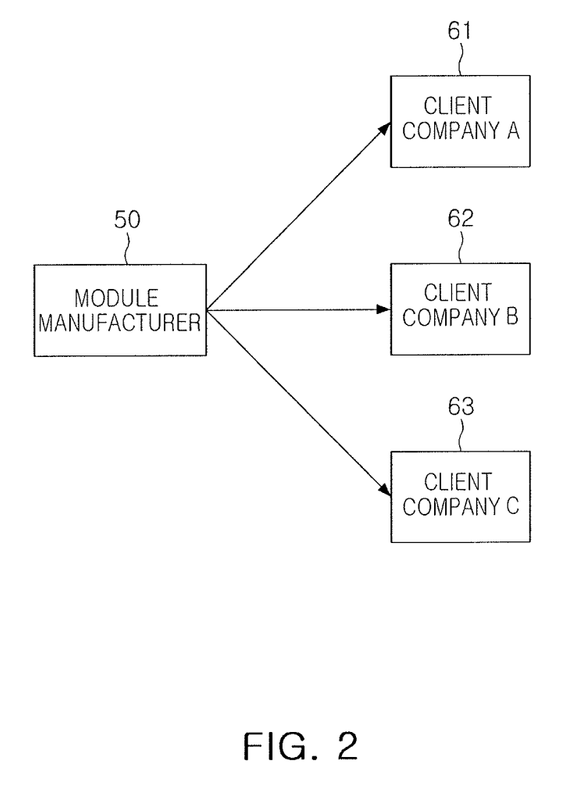
FIG. 2 illustrates a view for describing a method for manufacturing an Internet of Things device including an Internet of Things module according to an example embodiment.

FIG. 2 is a view for describing a method for manufacturing an Internet of Things device according to an example embodiment. Referring to FIG. 2, a module manufacturer 50 may sell Internet of Things modules to a plurality of device manufacturers 61 to 63 different from each other. The Internet of Things modules, which the module manufacturer 50 provides to the plurality of device manufacturers 61 to 63, may be the same kind as each other and may have the same boot firmware. In an example embodiment, the boot firmware in a boot image may be stored in a non-volatile memory device of each of the Internet of Things modules. The device manufacturers 61 to 63 may process or modify the boot firmware and may store the processed/modified boot firmware in the non-volatile memory device of the Internet of Things module in a manufacturing process of the Internet of Things devices with the Internet of Things modules.

It may be practically impossible that the module manufacturer 50 may provide different security keys to respective Internet of Things devices to be produced by the plurality of device manufacturers 61 to 63 for a secure boot function. Thus, when device manufacturers 61 to 63 produce and sell the Internet of Things devices including the same Internet Things module purchased from the module manufacturer 50, boot firmware of the Internet of Things devices may be easily secure-booted or rolled back by a boot image of an Internet of Things module mounted on another Internet of Things device. For example, by a boot image of an Internet of Things module mounted in an Internet of Things device of Company A 61, an Internet of Things module embedded in an Internet of Things device of Company B 62 or Company C 63 may be secure-booted. Alternatively, by boot firmware corresponding to a boot image of an Internet of Things module mounted in an Internet of Things device of Company A 61, boot firmware of an Internet of Things module mounted in an Internet of Things device of Company B 62 or Company C 63 may be unintentionally rolled back to a previous version.

In example embodiments, an Internet of Things module may include a processor unit and a memory unit, and the memory unit may have a security area accessible through a predetermined authentication procedure. The security area of the memory unit may store a security key for secure boot, a release version of boot firmware, or the like, as well as an authentication key for verifying access authority to the security area. For example, the authentication key may be, e.g., a hardware unique key (HuK). When the Internet of Things module is first booted, the authentication key may be generated by the processor unit and may be injected/written to the security area of the memory unit.

In an exemplary embodiment, when a boot process of an Internet of Things module begins, a processor unit may read a boot image stored in a boot area of a memory unit and may execute boot firmware. At the same time, the processor unit may compare a release version of boot firmware and information of a security key stored in the boot area of the memory unit with a release version of boot firmware and information on a security key stored in a security area of the memory unit, respectively. According to the comparison result, the processor unit may perform a secure boot function for preventing being booted by a boot image and/or boot firmware copied through an unauthorized route may be provided and/or for preventing unintentional rollback of boot firmware.

Figure 3:
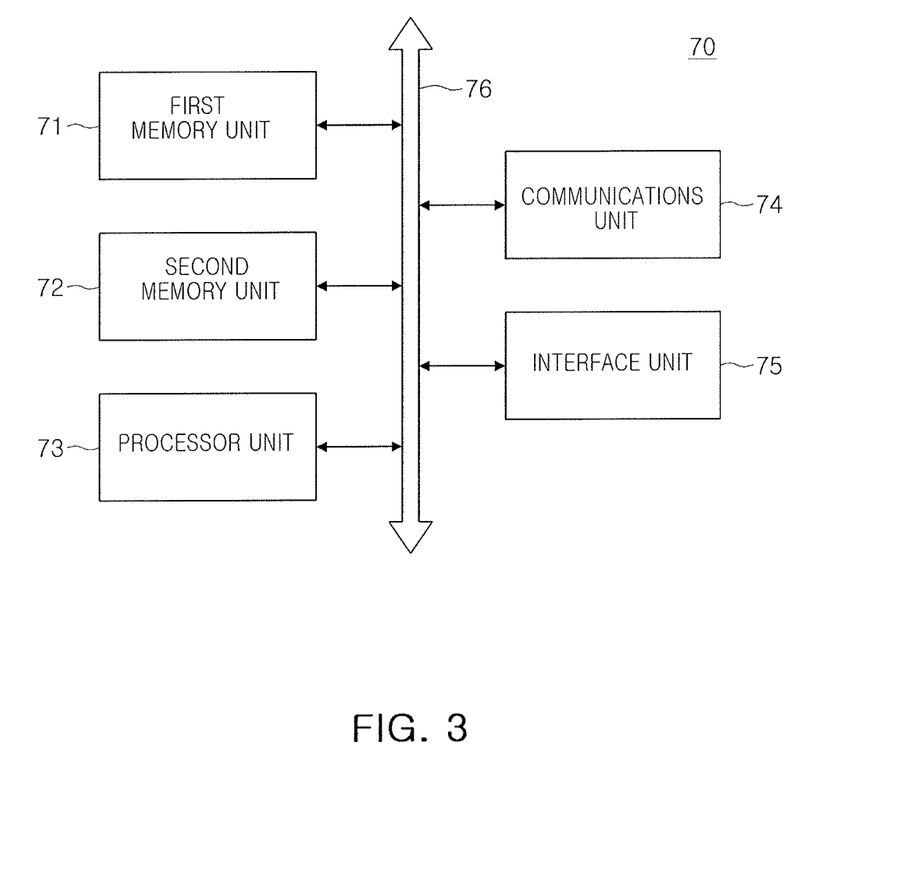
FIGS. 3 to 5 illustrate schematic block diagrams for describing an Internet of Things module according to an example embodiment.
Figure 4:
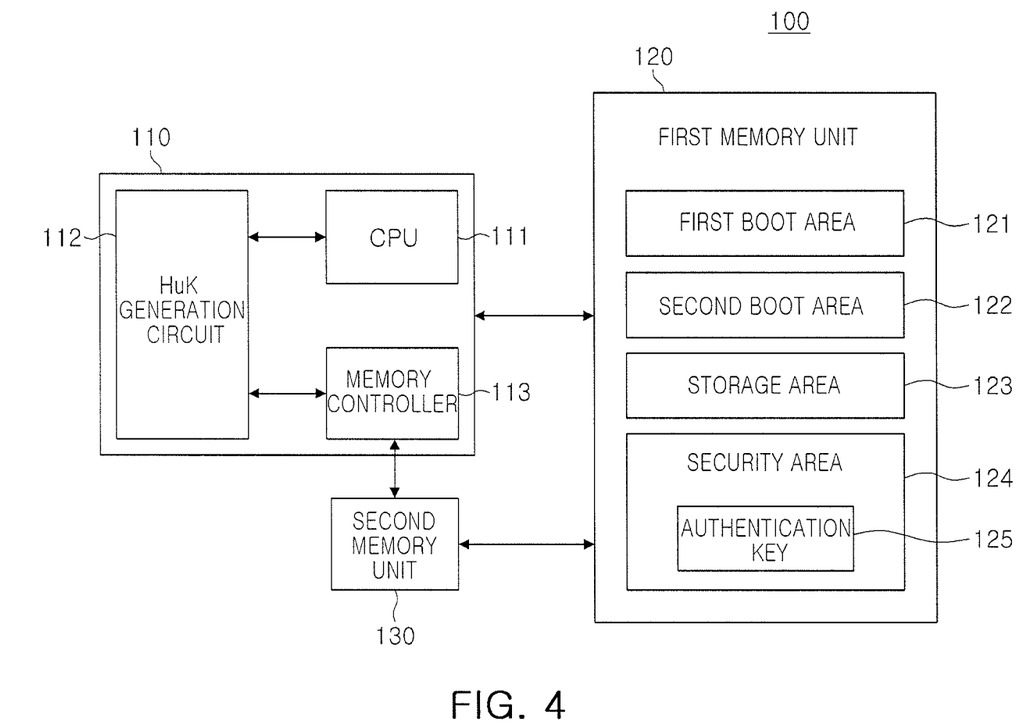
Figure 5:
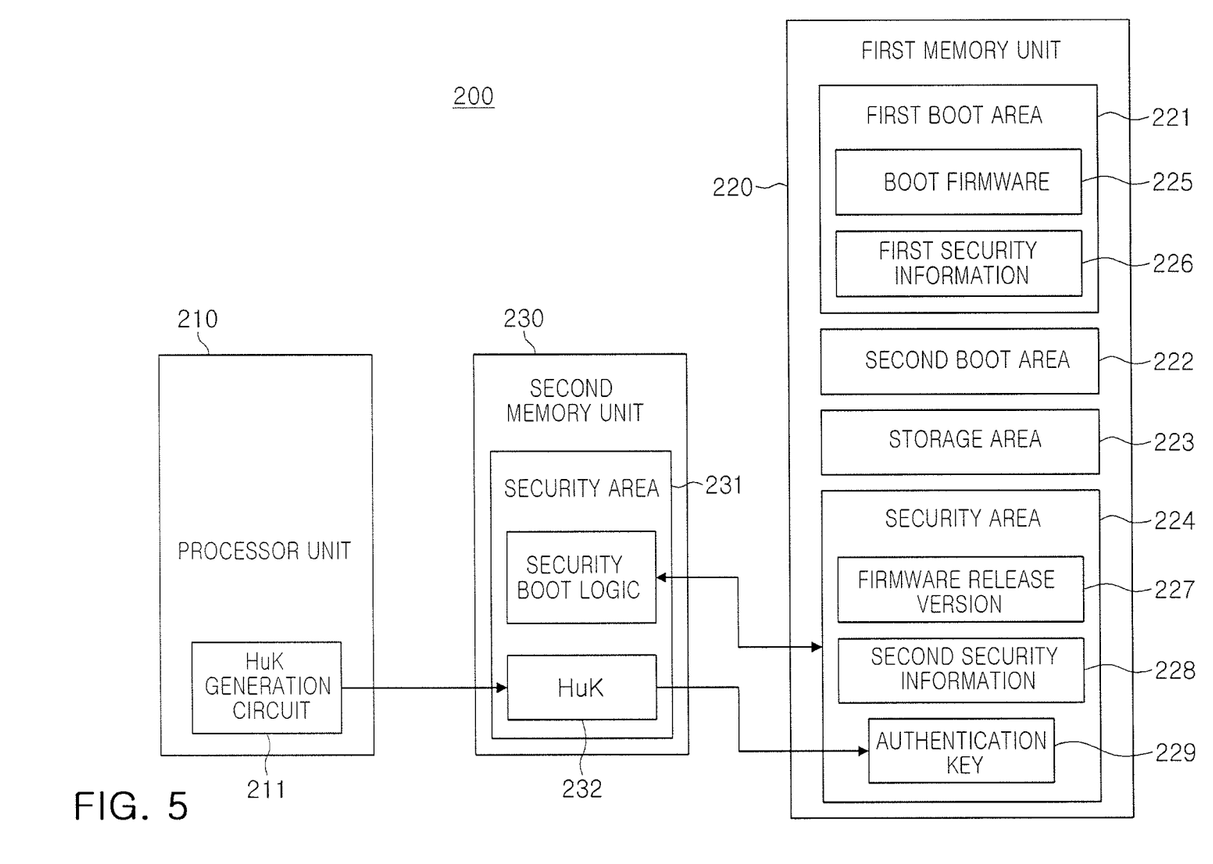

FIGS. 3 to 5 are schematic block diagrams for describing an Internet of Things module according to an example embodiment.

Referring to FIG. 3, an Internet of Things module 70 according to an example embodiment may include a first memory unit 71, a second memory unit 72, a processor unit 73, a communications unit 74, an interface unit 75, and the like. The units 71 to 75 included in the Internet of Things module 70 may send and receive data through a bus 76.

The first memory unit 71 and the second memory unit 72 may be different types of memory devices. For example, the first memory unit 71 may be a non-volatile memory device/circuit, and the second memory unit 72 may be a volatile memory device/circuit. For example, the first memory unit 71 may be implemented as an Embedded Multi Media Card (eMMC), a NAND flash memory, or the like, and the second memory unit 72 may be implemented as a Dynamic Random Access Memory (DRAM).

The processor unit 73 may control an overall operation of the Internet of Things module 70. The processor unit 73 may be implemented as a processing circuit, a central processing unit (CPU), or the like. When the Internet of Things module 70 is turned on, the processor unit 73 may read a boot image stored in the first memory unit 71 directly or through the second memory unit 72 and may execute boot firmware, an operating system, and the like. Thus, a boot process of the Internet of Things module 70 may be in progress by the processor unit 73. While the boot process is in progress, the processor unit 73 may check whether the boot firmware has been hacked or whether the boot firmware has been unintentionally rolled back by using security information, a firmware release version, and/or the like stored in a security area of the first memory unit 71.

The communications unit 74 may provide one or more wired/wireless communications functions. For example, the communications unit 74 may provide a communications function, e.g., wireless LAN (e.g., Wi-Fi, Bluetooth), Zigbee®, or the like. The interface unit 75 may include a display interface for connecting, e.g., a camera, a display, or the like, and a wired communications interface for connecting the communications unit 74, or the like. For example, the interface unit 75 may include a Mobile Industry Processor Interface (MIPI) as a display interface and may include an inter-integrated circuit (I2C), a universal asynchronous receive-transmitter (UART), an inter-IC sound (I2S), or the like as a wired communications interface.

Next, referring to FIG. 4, an Internet of Things module 100 according to an example embodiment may include a processor unit 110, a first memory unit 120, and a second memory unit 130. For example, the processor unit 110 may include a central processing unit (CPU) 111, a hardware unique key generation circuit 112, a memory controller 113, and the like, and may be implemented as a System-On-Chip (SoC). The first memory unit 120 may be implemented as a non-volatile memory and may be an Embedded Multi Media Card (eMMC), a NAND flash memory, or the like.

The memory controller 113 may set a security-attribute of the second memory unit 130. For example, the memory controller 113 may include a TrustZone Protection Controller (TZPC) using a trustzone scheme for performing logical partitioning on a peripheral device for security software and general software. At least a portion of the second memory unit 130 may be allocated as a security area by the memory controller 113.

The first memory unit 120 may include first and second boot areas 121 and 122, a storage area 123 for storing general data, a security area 124 as a security memory area, and the like. The first and second boot areas 121 to 124 may be memory areas defined in a manufacturing step of the first memory unit 120. The security area 124 may store an authentication key 125 for checking/verifying an access authority to the security area 124. For example, the authentication key 125 may be a hardware unique key (Huk) generated and injected by the hardware unique key generation circuit 112 of the processor unit 110 when the Internet of Things module 100 is first booted. The security area 124 may be a memory area only accessible when passing an authentication procedure performed with the authentication key 125, in a manner different from the storage area 123 for storing general data. For example, the security area 124 may be a Replay Protected Memory Block (RPMB).

The hardware unique key generation circuit 112 may generate the authentication key 125 as the hardware unique key (Huk) based on a circuit structure included in the processor unit 110. The hardware unique key may vary according to characteristics of the circuit structure included in the processor unit 110. Thus the hardware unique key may have a unique value according to the circuit structure included in the processor unit 110 such that the risk of hacking may be significantly reduced. The hardware unique key may be injected/written to the security area 124 when the Internet of Things module 100 is first booted, and may be used for the authentication procedure for determining the access authority to data stored in the security area 124 by the processor unit 110. The Internet of Things module 100 may be produced by a module manufacturer and may be sold to a device manufacturer. The device manufacturer may produce an Internet of Things device on which the Internet of Things module 100 is mounted and may be sold to an end-user. Thus, as the hardware unique key may be injected to the security area 124 in a first boot operation of the Internet of Things module 100, the procedure for setting the authentication key 125 in the security area 124 of the first memory unit 120 may be performed by the module manufacturer or the device manufacturer.

Each of the first and second boot areas 121 and 122 may store a boot loader, a boot image, and the like. For example, boot firmware may be stored in each of the first and second boot areas 121 and 122 in the form of the boot image. Further, at least one of the first and second boot areas 121 and 122 may store information for performing a secure boot function as first security information. In an example, the first security information may be stored in the first boot area 121 that is first loaded when the Internet of Things module 100 is booted. For example, the first security information may include a hash value of a first security key given by the device manufacturer in a manufacturing step of the Internet of Things device having the Internet of Things module 100.

In another example, the security area 124 may store information for performing a secure boot function as second security information. For example, the second security information may be stored in the security area 124 when boot firmware is stored and released in the first and second boot areas 121 and 122 by a hardware security module (HSM), and the like. The second security information may include a hash value of a second security key given by a device manufacturer in a manufacturing step of an Internet of Things device having the Internet of Things module 100.

As described above, when a plurality of device manufacturers may produce and provide various Internet of Things devices including the Internet of Things module 100 manufactured by a single module manufacturer, boot firmware stored in the first and second boot areas 121 and 122 of the first memory unit 120 of the Internet of Things module 100 may be overwritten or modified with other boot firmware. Thus, when a secure boot function is not provided in the Internet of Things module 100, the Internet of Things module 100 may be booted by the overwritten or modified boot firmware.

To solve the problem described above, in an example embodiment, only when the first security information stored in at least one of the first and second boot areas 121 and 122 matches (or is same as) the second security information stored in the security area 124, a boot process can be in progress. The second security information may be a hash value of the second security key stored in the security area 124 through a hardware security module by a device manufacturer when boot firmware is released. The second security information stored in the security area 124 may not be changed after the boot firmware is released. Thus, when the boot firmware stored in each of the first and second boot areas 121 and 122 is changed/modified to another firmware, a boot process of the Internet of Things module 100 having the modified firmware stored in each of the first and second boot areas 121 and 122 may stop due to inconsistency between the first security information in one of the first and second boot areas 121 and 122 and the second security information in the security area 124. As a result, the Internet of Things module 100 may not be exposed to the risk of hacking using boot firmware copied from an external source and may be secured.

Moreover, in an example embodiment, while a boot process the Internet of Things module 100 is in progress, a version of boot firmware stored in each of the first and second boot areas 121 and 122 may be compared with a firmware release version stored in the security area 124. The firmware release version may be a version of boot firmware released through a hardware security module by a device manufacturer. The processor unit 110 may stop the boot process of the Internet of Things module 100, when the version of boot firmware stored in each of the boot areas 121 and 122 is older than the firmware release version stored in the security area 124. Thus, firmware rollback, caused by the boot firmware stored in each of the boot areas 121 and 122 through an unauthorized route, may be prevented.

Next, referring to FIG. 5, an Internet of Things module 200 according to an example embodiment may include a processor unit 210, a first memory unit 220, a second memory unit 230, and the like. As described above, the first memory unit 220 may be a non-volatile memory, e.g., an embedded multimedia card (eMMC), a NAND flash memory, or the like.

The processor unit 210 may include a hardware unique key generation circuit 211. A hardware unique key (HuK) 232 may be generated and may correspond to a microstructure of a circuit which is present in the processor unit 210. For example, the microstructure of the circuit in the processor unit 210 may have a random structure in a unique shape. Thus, the Internet of Things modules 200 manufactured by the same module manufacturer may have different hardware unique keys from each other.

The hardware unique key 232 may be injected/written to a security area 224 of the first memory unit 220 through a security area 231 of the second memory unit 230 when the Internet of Things module 200 is first booted. As described above, the security area 231 of the second memory unit 230 of the second memory unit 230 may be a memory area allocated by a memory controller included in the processor unit 210. For example, the Internet of Things module 200 may be generally sold and/or provided to a device manufacturer with boot firmware stored therein. Thus, a first boot operation of the Internet of Things module 200 may be generally executed by a module manufacturer rather than the device manufacturer. The hardware unique key 232 may be used as an authentication key 229 for determining an access authority to the security area 224 of the first memory unit 220, after the hardware unique key 232 is injected/written to the security area 224 of the first memory unit 220.

For example, a module manufacturer may store information of boot firmware stored in first and second boot areas 221 and 222 and information of a common key in the security area 224 of the first memory unit 220, before the Internet of Things module 200 is sold and/or provided to a device manufacturer. The common key may be commonly/uniformly injected/written to the Internet of Things module 200 produced by the module manufacturer, and a hash value of the common key, or the like, may be stored in the security area 224 of the first memory unit 220. Further, information of boot firmware, stored in the security area 224, may include version information of boot firmware provided by the module manufacturer. The security area 224 of the first memory unit 220 may be a replay protected memory block (RPMB), and may be a memory area accessible only when passing an authentication procedure performed with the authentication key 229 injected by the processor unit 210 when first boot is performed.

For example, the common key may be injected/written to the Internet of Things module 200 by the module manufacturer and may be replaced with a unique security key provided from the device manufacturer, the device manufacturer may manufacture the Internet of Things device including the Internet of Things module 200. In a development/production process of an Internet of Things device, the device manufacturer may inject the unique security key to the first memory unit 220 and may process or modify boot firmware (or an operating system) provided in the boot areas 221 and 222 by a module manufacturer. The boot firmware and the operating system may be stored in a boot image in the boot areas 221 and 222.

The device manufacturer may perform a firmware release procedure with a hardware security module, or the like, before selling and/or providing the Internet of Things device to end-users. For example, in the firmware release procedure, information of a unique security key of the device manufacturer may provide the information of the unique security key in the boot areas 221 and 222 and in the security area 224 as first security information and second security information, respectively. Moreover, a version of boot firmware, stored in the boot areas 221 and 222 in the firmware release procedure, may be stored in the security area 224 as a firmware release version.

The second security information and the firmware release version are stored in the security area 224, and may not be changed or deleted without passing an authentication procedure performed with the hardware unique key 232 as the authentication key 229 stored in the security area 224 of the first memory unit 220. Thus, the Internet of Things module 200 mounted on an Internet of Things device provided to an end-user may determine whether a boot image 225 stored in the boot areas 221 and 222 is contaminated or not through comparing second security information 228 stored in the security area 224 of the first memory unit 220 with first security information 226 stored in the boot areas 221 and 222 of the first memory unit 220. For example, when the first security information 226 in the first boot area 221 does not match the second security information 228 in the security area 224, the processor unit 210 may determine that the boot image 225 is contaminated and may stop a boot process of the Internet of Things module 200.

In an example embodiment, the Internet of Things module 200 may provide a rollback protection function through comparing a firmware release version 227 stored in the security area 224 of the first memory unit 220 with a firmware version of the boot image 225 stored in the boot areas 221 and 222 of the first memory unit 220. For example, when the first security information 226 in the first boot area 221 matches the second security information 228 in the security area 224, the firmware version of the boot image stored in the boot areas 221 and 222 may be different (or older) than the firmware release version stored in the security area 224. In this case, the boot process of the Internet of Things module 200 may be stopped to prevent rollback of boot firmware. Thus, the Internet of Things module 200 may provide a secure boot function for preventing from being booted with unauthorized boot firmware and may provide a rollback protection function for preventing unintentional rollback of boot firmware.

Figure 6:
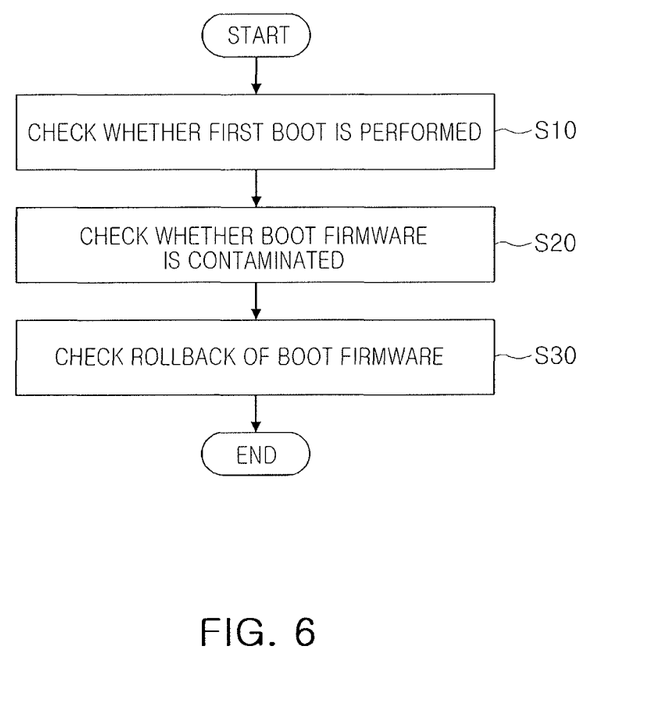
FIGS. 6 and 7 illustrate flow diagrams for describing an operation of an Internet of Things module according to an example embodiment.
Figure 7:
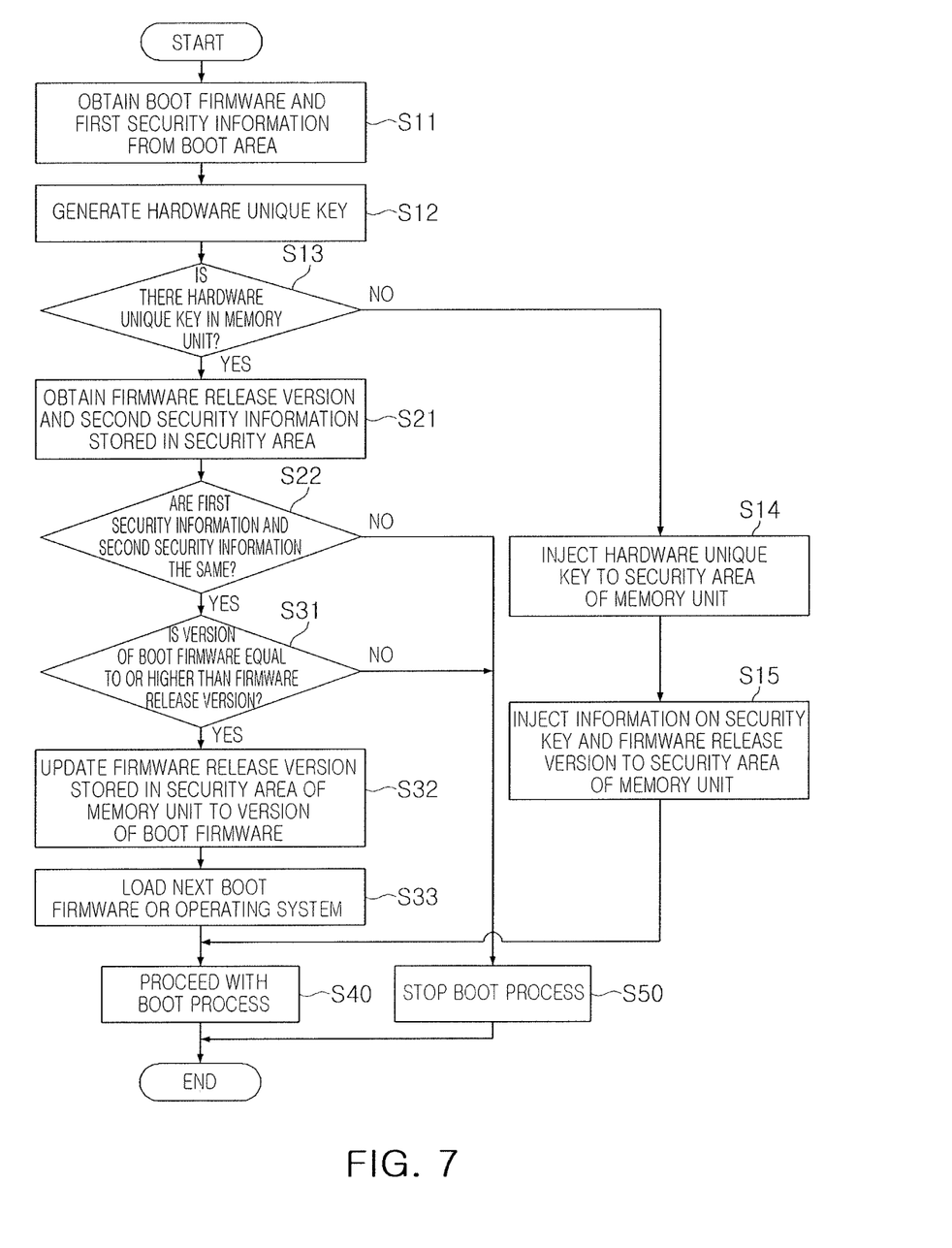

FIGS. 6 and 7 are flow diagrams for describing an operation of an Internet of Things module according to an example embodiment.

Referring to FIG. 6, in an example embodiment, when an Internet of Things module is powered on, an operation of the Internet of Things module may be started with a check procedure/action that a processor unit checks whether a boot process of the Internet of Things module is a first boot or not (S10). For example, the processor unit may check whether the first boot of the Internet of Things module is performed or not through determining whether a hardware unique key is injected/stored in a memory unit including a non-volatile memory device, e.g., a NAND flash memory, an eMMC, or the like. When it is checked whether the boot process of the Internet of Things module is a first boot in S10, i.e., when the memory unit does not have any hardware unique key, the processor unit may generate a hardware unique key and may store the generated hardware unique key to the memory unit.

After the check procedure for checking whether a first boot the Internet of Things module is performed, the processor unit may check whether boot firmware has been contaminated (S20). For example, the boot firmware may be stored in at least one of a plurality of boot areas of the memory unit in the form of a boot image. Further, the boot areas of the memory unit may include first security information for determining whether the boot firmware is contaminated or not. The first security information may be a hash value of a security key injected/written to the boot areas together with the boot firmware, or the like.

For example, the processor unit may check whether the boot firmware has been contaminated through comparing the first security information read from the boot areas with second security information stored in a security area of the memory unit. The security area of the memory unit may be a memory area accessible only through a separate authentication procedure. Thus, the second security information stored in the security area may not be changed and/or deleted after an Internet of Things device having the Internet of Things module is provided and/or sold to an end-user, in a different manner from the first security information stored in the boot areas. For example, the second security information may be injected/written to the security area by a device manufacturer manufacturing the Internet of Things device.

When it is determined that the boot firmware is not contaminated, the processor unit may check whether the boot firmware is rolled back or not (S30). The processor unit may determine whether the boot firmware is rolled back through comparing a firmware release version stored in the security area of the memory unit with a version of the boot firmware executed using the boot image.

The firmware release version stored in the security area may correspond to a version of boot firmware finally released before the device manufacturer provides the Internet of Things device to the end-user. For example, when the firmware release version in the security area is newer than or same as the version of the boot firmware loaded from the at least one of the boot areas, the processor unit may stop the boot process of the Internet of Things module in order to prevent rollback of the boot firmware.

Referring to FIG. 7, a boot process of an Internet of Things module according to an example embodiment will be described. An operation method of an Internet of Things module may be started with an acquiring procedure/action that a processor unit obtains a boot image and first security information stored in a boot area of a memory unit (S11). The memory unit having the boot area may be implemented as a non-volatile memory device, and the first security information may include a hash value of a predetermined security key, or the like.

The processor unit may obtain/read a boot image and first security information through directly accessing the boot area of the memory unit or through accessing the boot area through a volatile memory device, or the like. Boot firmware may be executed through loading the boot image. For example, the hardware unique key generation circuit embedded in a processor unit may generate a hardware unique key (S12). The hardware unique key is a key generated based on a microstructure (e.g., a random structure in a unique shape) of a circuit present in a processor unit, and may have values different from each other in the same Internet of Things modules manufactured by a single module manufacturer.

The processor unit may determine whether there is the hardware unique key injected/written to the memory unit (S13). For example, when there is no hardware unique key in the memory unit, the processor unit may determine that the Internet of Things module is first booted. On the other hand, when there is the hardware unique key in the memory unit, it is determined that the Internet of Things module has previously been booted.

For example, when it is determined that the Internet of Things module is first booted in S13, the processor unit may inject the hardware unique key generated in S12 to a security area of the memory unit as an authentication key (S14). Further, a version of the boot firmware executed using the boot image obtained in S11 may be stored in the security area as a firmware release version, and the first security information obtained in S11 may be stored in the security area as second security information (S15). Thereafter, the processor unit may load a subsequent boot image from the boot area of the memory unit and may execute boot firmware (or an operating system) based on the subsequent boot image, and may proceed the boot process of the Internet of Things module (S40).

For example, a first boot of the Internet of Things module may be executed by the module manufacturer producing and providing the Internet of Things module. Thus, the firmware release version stored in the security area of the memory unit in S15 may be a version of boot firmware processed by the module manufacturer and stored in the boot area. Further, the second security information stored in the security area of the memory unit in S15 may be a hash value of a common key commonly/uniformly injected/written to the same Internet of Things modules produced and provided by the single module manufacturer.

For example, the firmware release version stored in the security area of the memory unit in S15 may be updated as a new version by a device manufacturer who purchase the Internet of Things module and produce an Internet of Things device thereafter. The device manufacturer may modify and/or process the boot firmware and the operating system, stored in the boot area, in a manufacturing process of the Internet of Things device. The device manufacturer may proceed with a firmware release procedure using a hardware security module, or the like, before providing the Internet of Things device to an end-user.

In the firmware release procedure, the device manufacturer may store boot firmware, finally processed, in the boot area of the memory unit. Further, the hash value of the unique security key provided by the device manufacturer in S15 may be stored in the boot area as first security information. Simultaneously, the version of the boot firmware stored in the boot area of the memory unit may be stored in the security area of the memory unit as a firmware release version, and the hash value of the unique security key of the device manufacturer may be stored in the security area of the memory unit as second security information.

The security area of the memory unit, in which the firmware release version and the second security information are stored, may be a memory area to which cannot be accessed without passing through a predetermined instruction set and may be an RPMB. Thus, the firmware release version and the second security information, stored in the security area before the device manufacturer provides the Internet of Things device to the end-user, may not be changed and/or deleted in a subsequent distribution process of the Internet of Things module.

However, when it is determined that the Internet of Things module is not first booted in S13, the processor unit may read the firmware release version and the second security information stored in the security area of the memory unit (S21). The processor unit may compare the second security information read in S21 with the first security information read in S11 (S22). When the first security information and the second security information are matched with each other in S22, the processor unit may determine that the boot image obtained from the boot area is not contaminated. On the other hand, when it is determined that first security information and second security information are not matched with each other in S22, the processor unit may determine that the boot image stored in the boot area is contaminated and may stop the boot process of the Internet of Things module (S50).

As a result of determination in S22, when the first security information and the second security information are matched with each other, the processor unit may determine whether the version of boot firmware executed using the boot image obtained in S11 is equal to or newer than the firmware release version read in S21 (S31). As a result of determination in S31, when the version of boot firmware executed by the boot image obtained in S11 is older than the firmware release version read in S21, the processor unit may determine that there is a risk of boot firmware rollback. Thus, the processor unit may stop the boot process of the Internet of Things module (S50).

On the other hand, as a result of determination of S31, when the version of boot firmware executed by the boot image is equal to or newer than the firmware release version, the processor unit may determine that there is no risk of boot firmware rollback. Thus, when the firmware release version is older than the version of boot firmware executed using the boot image, the firmware release version stored in the security area may be updated to the version of the boot firmware executed using boot image (S32). Thereafter, the processor unit may execute a subsequent boot firmware and/or operating system (OS) by sequentially loading boot images in the boot area (S33) and may proceed with the boot process of the Internet of Things module (S40).

As illustrated with reference to FIG. 7, the first security information read from the boot area of the memory unit may be compared with the second security information stored in the security area of the memory unit, so it may be determined whether the boot image stored in the boot area is contaminated. Further, when the first security information and the second security information are matched with each other, the version of boot firmware executed using the boot image is equal to or newer than the firmware release version stored in the security area, the boot process of the Internet of Things module may be progressed. Thus, rollback of boot firmware, not intended, may be prevented.

Figure 8:
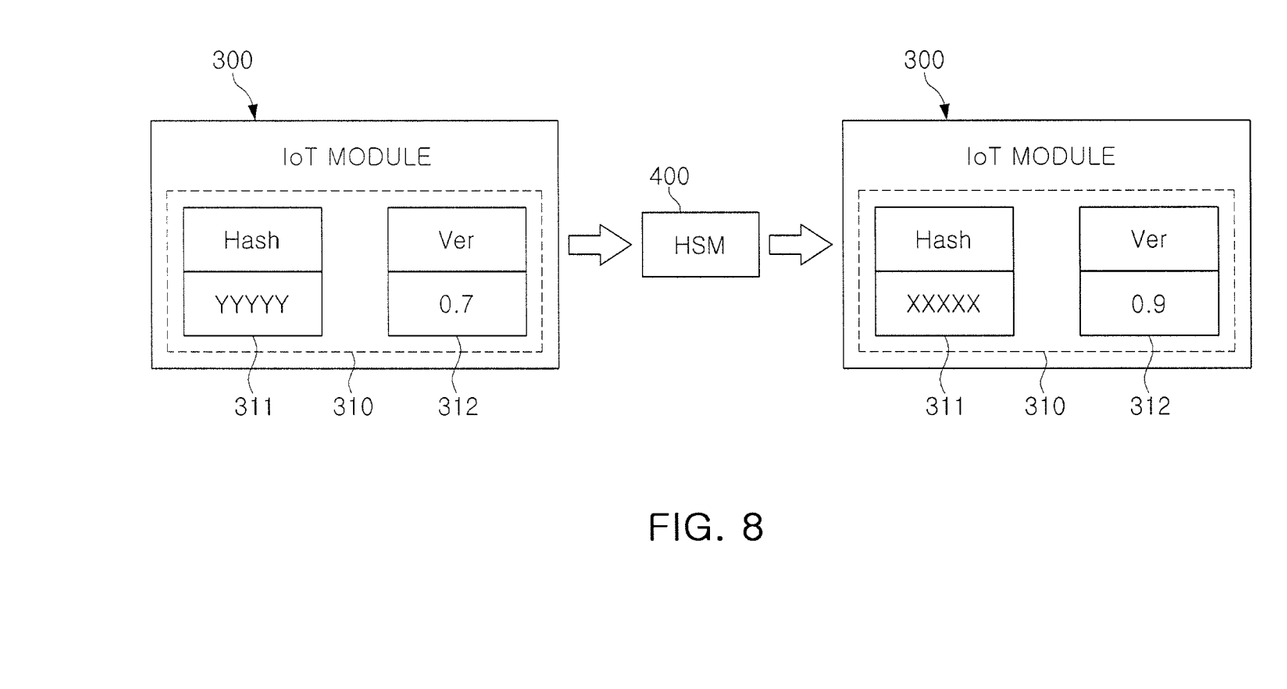
FIGS. 8 and 9 illustrate views for describing an operation of an Internet of Things module according to an example embodiment.
Figure 9:
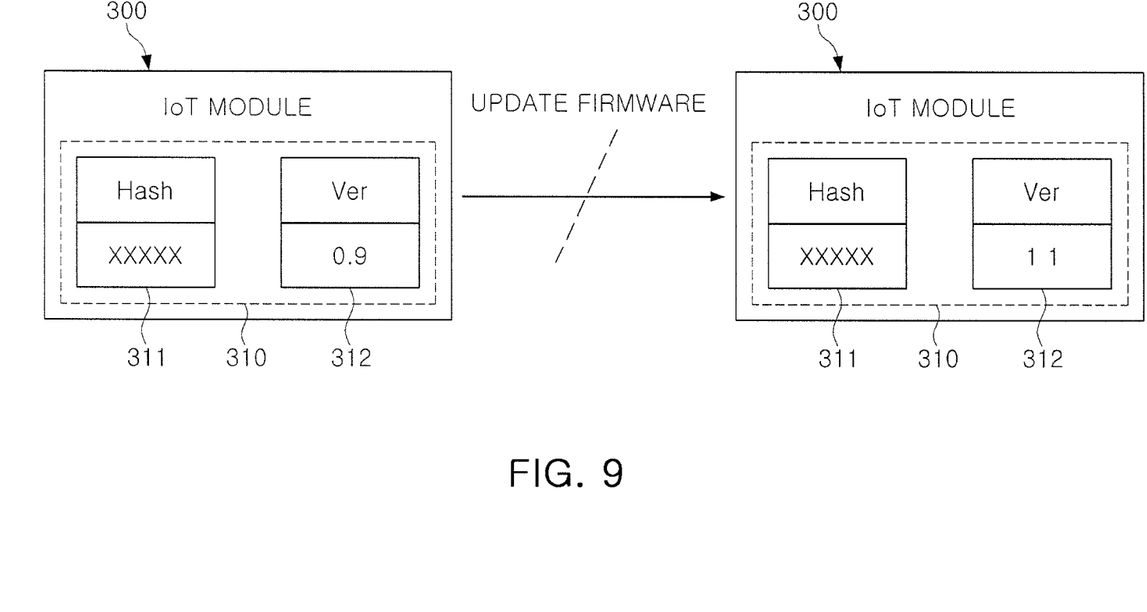

FIGS. 8 and 9 are views for describing an operation of an Internet of Things module according to an example embodiment.

Referring to FIG. 8, in an example embodiment, a security area 310 of a memory unit of an Internet of Things module 300 may store second security information 311 and a firmware release version 312. The second security information 311 may be a hash value of a common key, and the common key may be a key stored in the security area 310 of the memory unit by a module manufacturer who produces and/or provides the Internet of Things module 300. The firmware release version 312 may be a version of boot firmware which is stored in a boot area of the memory unit by the module manufacturer.

An example embodiment of FIG. 8 may illustrate a firmware release procedure that a device manufacturer, who purchases an Internet of Things module and/or produces an Internet of Things device, may release a new/updated firmware after development of the Internet of Things device. Referring to FIG. 8, the device manufacturer may inject/write a new version of boot firmware to the Internet of Things module 300 using a hardware security module 400 such that the second security information 311, stored in the security area 310, may be unique. Thus, as illustrated in FIG. 8, the second security information 311 stored in the security area 310 of the memory unit may be changed, and the firmware release version 312 may be changed.

In an example embodiment, referring to FIG. 9, after an Internet of Things device having the Internet of Things module 300 is provided to an end-user, boot firmware of the Internet of Things module 300 may be updated by various needs. Referring to FIG. 9, when the boot firmware of the Internet of Things module 300 is updated, the firmware release version 312 stored in the security area 310 may be increased. Before the firmware release version 312 is overwritten/updated to the security area 310 of the memory unit, a first comparison between a hash value of a security key stored in a boot area and the second security information 311 stored in the security area 310 and a second comparison between a version of boot firmware stored in the boot area and the firmware release version 312 stored in the security area 310 may be executed in a firmware update process. For example, either when a new version of boot firmware for updating an old version of boot firmware is lower than 0.9 or when a hash value of a security key stored in the hoot area together with the old boot firmware is different from the second security information 311, the firmware update process may not be executed.

Embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the disclosure. Further, the blocks, units and/or modules of the embodiments may be physically combined into more complex blocks, units and/or modules without departing from the scope of the disclosure.

As set forth above, according to example embodiments, unintentional rollback of boot firmware, or the like is prevented without using, e.g., eFuse, OTP, or the like, such that integrity (or flawless) of firmware may be secured and guaranteed. In other words, an additional space for eFuse, OPT, or the like may not be required such that a size of an Internet of Things module may be reduced and a manufacturing cost for the Internet of Things module may be decreased. Further, in a firmware release process, a public key (or a common key), assigned/written in the Internet of Things module by a module manufacturer manufacturing the Internet of Things module, may be replaced with a security key of a device manufacturer manufacturing an Internet of Things device including the Internet of Things module. Thus, the risk of hacking on boot firmware of each of Internet of Things devices manufactured with the same Internet of Things module may be reduced. Moreover, a secure boot function for each of the the Internet of Things devices may be provided by using information of a security key stored in a security area of a memory device of each of the Internet of Things devices.

While example embodiments have been shown and described above, it will be apparent to those skilled in the art that modifications and variations could be made without departing from the scope of the present disclosure, as defined by the appended claims.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An Internet of Things module, comprising:
    a memory including a boot area for storing boot firmware and first security information and a security area for storing a firmware release version and second security information; and
    a processor to perform a boot process of the Internet of Things module using the boot firmware in the boot area, and to determine whether the boot process of the Internet of Things module is progressed or stopped through comparing the first security information in the boot area with the second security information in the security area and through comparing a version of the boot firmware in the boot area with the firmware release version in the security area,
    wherein the processor includes a unique hardware key generation circuit to generate a unique hardware key in a first execution of the boot firmware, the unique hardware key having a unique value derived from a circuit structure included in the processor, and
    the processor stores the unique hardware key in the security area and uses the unique hardware key as an authentication key to determine an access authority to the security area.

2. The Internet of Things module as claimed in claim 1, wherein the processor stores the unique hardware key in the security area, and replaces the firmware release version in the security area with the version of the boot firmware in the boot area, when the boot firmware is determined to be first executed.

3. The Internet of Things module as claimed in claim 2, wherein the processor determines that the boot firmware is first executed, when the unique hardware key is not in the security area.

4. The Internet of Things module as claimed in claim 2, wherein the processor uses the unique hardware key in the security area as an authentication key for accessing the security area.

5. The Internet of Things module as claimed in claim 1, wherein the processor stops the boot process of the Internet of Things module, when the first security information in the boot area and the second security information in the security area are different from each other.

6. The Internet of Things module as claimed in claim 1, wherein the processor stops the boot process, when the version of the boot firmware is older than the firmware release version.

7. The Internet of Things module as claimed in claim 1, wherein the processor replaces the firmware release version in the security area with the version of the boot firmware in the boot area, when the version of the boot firmware in the boot area is newer than the firmware release version in the security area.

8. The Internet of Things module as claimed in claim 1, wherein the second security information in the security area includes a public key injected or written by a device manufacturer manufacturing an Internet of Things device including the Internet of Things module.

9. The Internet of Things module as claimed in claim 1, wherein:
    the first security information includes a hash value of a security key injected or written to the boot area together with the boot firmware, and
    the second security information in the security area includes a hash value of a public key.

10. The Internet of Things module as claimed in claim 1, further comprising a volatile memory including a secure boot logic for obtaining the firmware release version and the second security information from the security area and for comparing the version of the boot firmware and the first security information in the boot area with the firmware release version and the second security information in the security area, respectively, in a security mode.

11. The Internet of Things module as claimed in claim 10, wherein the processor includes a volatile memory controller to control the volatile memory in the security mode.

12. The Internet of Things module as claimed in claim 11, wherein the volatile memory controller includes a TrustZone Protection Controller (TZPC).

13. The Internet of Things module as claimed in claim 10, wherein the processor stores the unique hardware key, generated based on the circuit structure included in the processor, in the security area through the secure boot logic when the boot firmware is first executed.

14. The Internet of Things module as claimed in claim 1, wherein the security area is a Replay Protected Memory Block (RPMB).

15. An Internet of Things module, comprising:
a first memory including a boot area for storing boot firmware for booting and a security area for storing a firmware release version for a rollback checking function of the boot firmware;
a second memory including a secure boot logic for obtaining the firmware release version in the security area through accessing the security area; and
a processor to provide a rollback protection function through comparing a version of the boot firmware in the boot area with the firmware release version in the security area,
wherein the processor includes a unique hardware key generation circuit to generate a unique hardware key, the unique hardware key having a unique value derived from a circuit structure included in the processor,
the processor stores the unique hardware key in the security area through the second memory, and
the first memory is a non-volatile memory and the second memory is a volatile memory.

16. The Internet of Things module as claimed in claim 15, wherein the processor executes the rollback protection function, and terminates a boot process of the Internet of Things module when the version of the boot firmware is older than the firmware release version in the security area.

17. The Internet of Things module as claimed in claim 15, wherein the processor determines that the boot firmware in the boot area is updated or renewed, and replaces the firmware release version in the security area with the version of the boot firmware in the boot area when the version of the boot firmware in the boot area is newer than the firmware release version in the security area.

18. The Internet of Things module as claimed in claim 17, wherein the processor stores the unique hardware key in the security area, and replaces the firmware release version in the security area with the version of the boot firmware in the boot area through an authentication procedure using the unique hardware key.

19. The Internet of Things module as claimed in claim 15, wherein the first memory is a non-volatile memory, and the second memory is a volatile memory.

20. An Internet of Things module, comprising:
a memory including a boot area for storing boot firmware and a security area for storing a predetermined authentication key, the security area and the boot area having different accessibility; and
a processor including a unique hardware key generation circuit to generate a unique hardware key, to store the unique hardware key in the security area as the predetermined authentication key when the boot firmware is first executed, and to obtain an access authority for accessing to the security area through an authentication procedure using the unique hardware key,
wherein:
the unique hardware key has a unique value derived from a circuit structure included in the processor, and
at least one of a second security key and a hash value of the second security key is stored in the boot area.

21. The Internet of Things module as claimed in claim 20, wherein the processor obtains a firmware release version stored in the security area through the authentication procedure using the unique hardware key when the boot firmware is executed, and determines whether the boot firmware is rolled back through comparing the firmware release version in the security area with a version of the boot firmware in the boot area.

22. The Internet of Things module as claimed in claim 20, wherein the processor obtains a hash value of a first security key stored in the security area through the authentication procedure using the unique hardware key when the boot firmware is executed, and determines whether the boot area is hacked or attacked through comparing the hash value of the first security key stored in the security area with the hash value of the second security key.

23. The Internet of Things module as claimed in claim 20, wherein the circuit structure included in the processor has a random structure in a unique shape.

\* \* \* \* \*